US009531670B2

(12) United States Patent
Gargett (10) Patent No.: US 9,531,670 B2
(45) Date of Patent: Dec. 27, 2016

(54) SYSTEM AND METHOD FOR NETWORK VIRTUALIZATION AND SECURITY USING COMPUTER SYSTEMS AND SOFTWARE (71) Applicant: iWebGate Technology Limited, Perth (AU)

(72) Inventor: Charles Dunelm Gargett, Lathlain (AU)

(73) Assignee: iWebGate Technology Limited, Perth (AU)

( * ) Notice: Subject to any disclaimer, the term of this patent is extended or adjusted under 35 U.S.C. 154(b) by 0 days.

(21) Appl. No.: 14/276,552

(22) Filed: May 13, 2014

(65) Prior Publication Data
US 2014/0245422 A1 Aug. 28, 2014

Related U.S. Application Data (63) Continuation-in-part of application No. 12/957,042, filed on Nov. 30, 2010.

(60) Provisional application No. 61/265,196, filed on Nov. 30, 2009.

(51) Int. Cl.
*G06F 9/00* (2006.01)
*H04L 29/06* (2006.01)
*H04L 12/46* (2006.01)

(52) U.S. Cl.
CPC ........... *H04L 63/02* (2013.01); *H04L 63/1408* (2013.01); *H04L 63/1491* (2013.01); *H04L 12/4641* (2013.01)

(58) Field of Classification Search
CPC .. H04L 63/0263; H04L 63/0227; H04L 63/02; H04L 63/029; H04L 63/0209; H04L 63/1408; H04L 63/1491; H04L 12/4641; H04L 29/06578; H04L 2209/76

USPC .......................................... 726/22–25, 11–15
See application file for complete search history.

(56) References Cited

U.S. PATENT DOCUMENTS

| 7,464,407 B2 * | 12/2008 | Nakae et al. | 726/22 |
| 7,958,549 B2 | 6/2011 | Nakae et al. | |
| 2003/0217131 A1 | 11/2003 | Hodge et al. | |
| 2004/0172574 A1 * | 9/2004 | Wing et al. | 714/4 |
| 2005/0108407 A1 * | 5/2005 | Johnson et al. | 709/228 |
| 2006/0074618 A1 * | 4/2006 | Miller et al. | 703/13 |
| 2006/0143699 A1 * | 6/2006 | Nagata et al. | 726/11 |
| 2007/0022479 A1 * | 1/2007 | Sikdar et al. | 726/22 |
| 2007/0192863 A1 * | 8/2007 | Kapoor et al. | 726/23 |
| 2007/0266431 A1 | 11/2007 | Matsuda | |
| 2008/0148341 A1 | 6/2008 | Ferguson et al. | |
| 2008/0163357 A1 * | 7/2008 | Xiao | 726/15 |
| 2008/0289040 A1 | 11/2008 | Ithal | |
| 2009/0254990 A1 * | 10/2009 | McGee | 726/22 |
| 2015/0012999 A1 * | 1/2015 | McGee | 726/13 |

* cited by examiner

*Primary Examiner* — Nirav B Patel
(74) *Attorney, Agent, or Firm* — Knobbe, Martens, Olson & Bear, LLP (57) ABSTRACT Methods and systems are provided for network security. In one embodiment, the method involves receiving a data packet (e.g., from a firewall). The method also involves running an inspection of the received data packet within a virtual network, the virtual network duplicating at least a portion (e.g., servers(s) and/or application(s)) of a protected network. The method further involves sending the inspected data packet, or portion and/or modified version thereof, to the protected network, in response to the data packet passing the inspection within the virtual network. The method also involves blocking passage of the data packet to the protected network, in response to the data packet failing the inspection.

34 Claims, 9 Drawing Sheets

SYSTEM AND METHOD FOR NETWORK VIRTUALIZATION AND SECURITY USING COMPUTER SYSTEMS AND SOFTWARE

CROSS-REFERENCE TO RELATED APPLICATIONS

Any and all applications for which a foreign or domestic priority claim is identified in the Application Data Sheet as filed with the present application are hereby incorporated by reference under 37 CFR 1.57.

This application is a continuation-in-part of U.S. application Ser. No. 12/957,042, filed Nov. 30, 2010, which claims the benefit of U.S. Provisional Application No. 61/265,196, entitled "Method for Digital Communications Security Using Computer Systems," filed Nov. 30, 2009, each of which is hereby expressly incorporated in its entirety by reference herein.

FIELD

The present application relates generally to communication security, and more particularly to computer-implemented security techniques for implementing a ghost/virtual network residing in a singular machine, physical or otherwise, to protect, in whole or in part, a client network.

BACKGROUND

The primary method for protecting a computer network from attacks is by employing an entity known as a screening device (e.g., a firewall or similar multi-component screening systems). The majority of modern screening devices protect a network by limiting what communication channels or "ports" are available to outside users wishing to connect with the protected network by inspecting the layer 3 and/or layer 4 protocol headers of incoming packets. In a standard (stand-alone) screening device, no additional investigation of the incoming communications is done beyond confirming that the incoming message is going to an allowed or authorized port that has been made available to known or unknown visitors alike by the network administrator. Other ports are considered closed and no communication is allowed through.

A common method of abusing this means of network protection is cloaking attack data within packets that may be labeled differently so that the screening device allows the data to pass through an authorized port to the protected network. The cloaked communications then reach an unhardened server and service within the protected network and use weaknesses in the design of that service to continue to abuse or damage the server or other nodes within the network.

Other more powerful and expensive types of firewalls go further by interrogating the incoming information, however this is an expensive, time consuming and highly customized application of screening device technology and as a result is not widely used on the Internet as a security method for small to medium sized organizations and some larger organizations. Accordingly, there is a need for a network security system that overcomes the above-described disadvantages of screening devices and known communication security techniques.

SUMMARY OF THE INVENTION

In accordance with one or more embodiments and corresponding disclosure thereof, various aspects are described in connection with a method performed by a virtual entity (e.g., virtual computing device, processor, or application). In one embodiment, the method may generally relate to generating and using a ghost or virtual duplication, in part or in whole, of components (e.g., server(s) and/or service(s) and/or application(s)) of a protected network to pre-process data. In another embodiment, the method may generally relate to generating and using a ghost or virtual network in a stand-alone manner. In related aspects to the previously stated embodiments, the method may involve receiving at least one data packet (e.g., from a remote client or a screening device). The method may involve receiving a stream of data packets from an optional transient host (e.g., a screening device) and reconstructing that stream of data packets into a service request. The method may involve running an inspection of the service request within a virtual network, the virtual network optionally duplicating at least a portion of the protected network. The method may involve running a processing of the service request within a virtual network wherein the service request is processed finally, and further, the final processing may require a response being issued from within the virtual network to the origin of the service request. In one possible alternative, the method may involve running a processing of the service request within a virtual network wherein the request is terminated and/or discarded within the virtual network. In yet another possible alternative, the method may involve sending the inspected or pre-processed service request (or portion and/or modified version thereof) to the protected network, in response to the service request being appropriately validated within the virtual network.

In related aspects where a protected network is involved, the protected network may comprise at least one protected server. The at least one protected server may comprise at least one protected service and/or application. The virtual network may comprise at least one virtual server, the at least one virtual server being a ghost or representation of the at least one protected server. The at least one virtual server may comprise at least one ghost service and/or application, the at least one ghost service and/or application being a duplicate or representation of the at least one protected service and/or application.

In further related aspects, running the processing of the service request may involve applying a pre-service security utility. In addition, or in the alternative, running the processing of the service request may involve applying a post-service security utility. In yet further related aspects, the method may involve blocking passage of the service request to the protected network, in response to the service request failing the processing.

In accordance with aspects of the embodiments described herein, there is provided a system for network virtualization and security, comprising: an optional, separate, protected network comprising at least one protected server; and a virtual network comprising at least one virtual server. The at least one virtual server may work stand-alone or be a ghost or representation of the at least one protected server including the at least one protected service and may be configured to: receive at least one data packet; reconstruct the at least one data packet into a service request; run a processing of the service request; and either process the service request finally and further, the final processing may require a response being issued from within the virtual network to the origin of the service request; or terminate and/or discard the service request within the virtual network; or, where a separate protected network is involved, send the processed service request to the protected network, in response to the service request passing appropriate validation within the virtual network. In one embodiment, the virtual network is a virtual duplicate or representation of the protected network. In another embodiment, the virtual network may include ghost(s) of a subset of the components (e.g., server(s) and/or service(s)) of the protected network. In yet another embodiment, the virtual network may have the capacity to operate within itself (stand-alone) with the same security measures in a self-protective manner.

Emanating from the foregoing, the one or more virtual servers formulate, in conjunction with other possible and/or optional elements, a virtual network, termed "Ghost Network", residing within the single entity or platform. Each of the virtual servers continues to function and operate in such a way that the service and/or application within, believes that it is securely operating within a "single-purposed" server, physical or otherwise.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other novel features will become apparent from the following detailed description when considered in conjunction with the drawings and the disclosed aspects are intended to include all such aspects and their equivalents.

DETAILED DESCRIPTION OF THE PREFERRED EMBODIMENT

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well known structures and devices are shown in block diagram form in order to facilitate describing one or more embodiments.

The word "exemplary" is used herein to mean "serving as an example, instance or illustration". Any embodiment described herein as "exemplary" is not necessarily to be construed as preferred or advantageous over other embodiments. The terms "screening device", "screening service" and "firewall" are used interchangeably herein to refer to a security device, typically without local storage or service knowledge beyond protocol headers included in data packets, that is deployed at the junction between a hostile network, such as the Internet, and a given network that the screening device is responsible for protecting, known as a "protected network". The protected network comprises at least one "server" which is capable of executing and running at least one "service" comprising at least one "application" wherein the at least one application may be responsible for providing the service itself. Where the Ghost Network is operating within itself, the Ghost Network may be considered the "protected network". The term "separate", when used in relation to the "protected network", except where the Ghost Network is considered to be the "protected network", is deemed to mean a network that is considered to be outside of the boundaries of the Ghost Network and may be a network to which the Ghost Network platform is directly attached or to which the Ghost Network platform has indirect access. A "ghost service" is considered to be of the type where communication may be established with the service from an external and/or adjacent (internal) source. A "supporting service" is considered to be of the type where communication may only be established from within a given network. A "protected service" is considered to be of the type where communication may only be established from a protecting source, for example but not limited to, the Ghost Network. Where the term "service" is not preceded by a type, for example but not limited to, "ghost", "supporting" or "protected", then the service is deemed to be inclusive of any type of service or combination thereof. The at least one service receives at least one "service request" that has been authorized to enter the protected network by the screening device, or the like, via at least one "port" or "service port". In reference to the at least one service, the term "service request" refers to a complete request comprising at least one data packet whose payload(s) have been used to reconstruct a message that is able to be understood by the at least one service. In reference to the screening device and to the at least one service, the term "port" or "service port" is used interchangeably herein to mean a single layer 4 protocol port, for example TCP, UDP or equivalent. The term "virtual network" and "ghost network" are used interchangeably herein and refer to a virtual network engineered through software capable of operating within itself (stand-alone) or communicating with at least one other network, virtual or physical, local or remote, and functions wholly on an operating system of a single given machine, wherein the "machine" may be a physical computing device (e.g., a server) or a virtual representation thereof. The virtual network is configured with at least one "virtual server" that may emulate an entire protected server, wherein the virtual server comprising at least one "ghost service" that is compatible, in one way or another, with the protected service. The term "security zone" refers to a network segment that lies between two other network segments of differing security levels and can be considered to be a buffer between the two and the transition of data in and out of the security zone may pass through a transient device such as a router, switch, screening device or the like. The term "ghost service" refers to an application, or part thereof, capable of accepting at least one data packet via the network and may rely on other applications to perform its role. The ghost service is not a "virtual" service in itself, however it may be capable of running virtual services within itself (e.g., a web server capable of handling more than one distinct website under different host names). The emulation of a protected server by a virtual server is achieved, in primary part, due to the ability to isolate the at least one ghost service, thereby formulating a virtual "single-purposed" server, within the virtual network in such a fashion that it would appear that the protected server being emulated may only run such services that are compatible in order to strengthen the security of that protected server and the protected services by means of separation from other servers running incompatible, yet possibly supporting, protected services.

In existing network security devices, such as a screening device, attempts to send information using the wrong port number are thwarted by disabling the corresponding port on the screening device. To facilitate the communications needed with legitimate services from outside the screening device, the screening device is instructed to relay or "redirect" at least one data packet, based on basic protocol header inspection, to services residing on the protected network. However this method, in turn, allows the transmission of damaging data packets, cloaked or otherwise, to arrive on the protected network at the protected server, where it is read and processed with potentially disastrous consequences. The screening device is unable to determine whether the at least one data packet is harmful or not, especially if the payload is encrypted. Additionally, the screening device is unaware of any unknown flaws in a specific service that the at least one data packet is intending to attack and therefore will not know that the payload of the at least one data packet is malicious because it is unable to process the at least one data packet as a full service request in the same fashion that would be executed by the service to which the at least one data packet is released.

Figure 1:
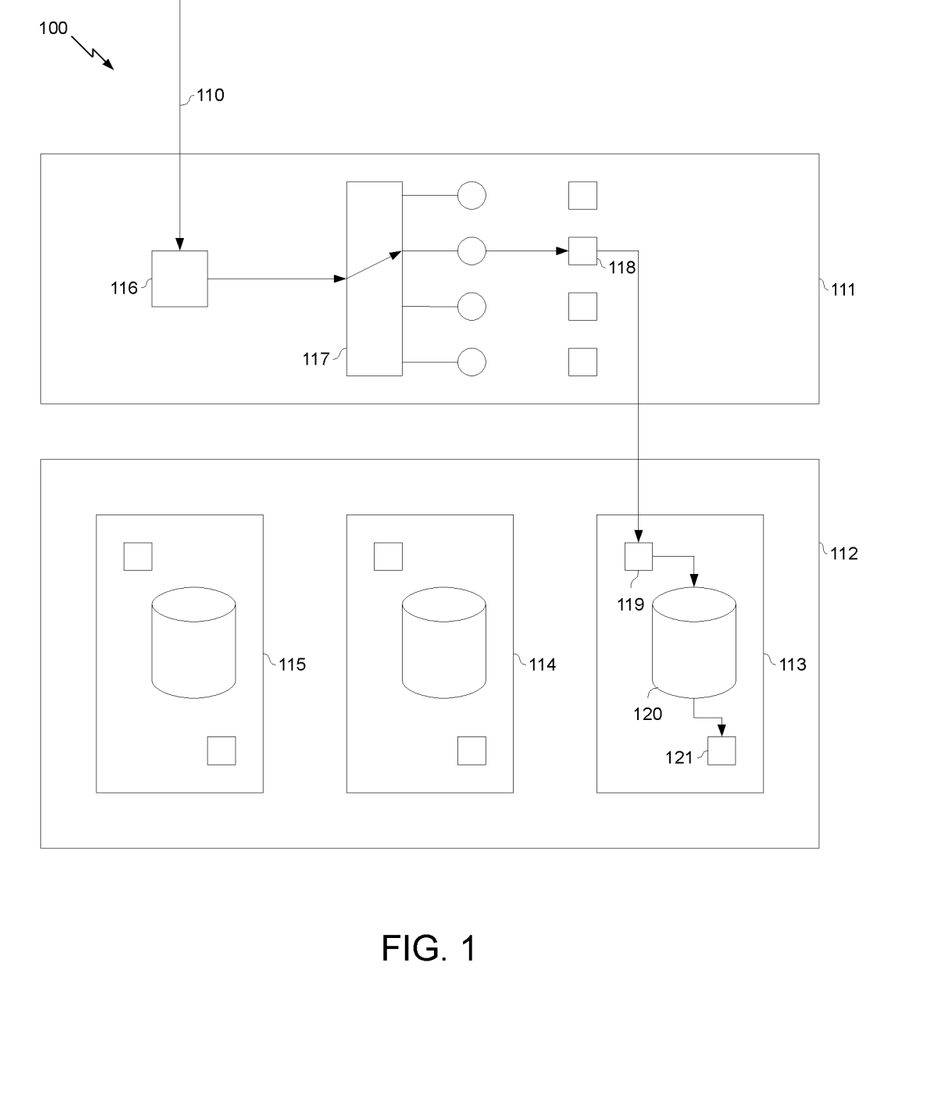
FIG. 1 shows a known advanced screening device.

FIG. 1 illustrates a known advanced screening device. Specifically, FIG. 1 shows a system 100 for detection and prevention of network and/or service attacks, comprising an intelligent screening device 111 that not only limits what port the data 110 can come into but also interrogates the data 110 using a packet analyzer 116 that then determines what type of data it is before passing it for verification 117 and for testing 118 before allowing it to be sent on to an appropriate server 113 within a protected network 112. The server 113 may comprise a component 120 for using/processing the data 110, wherein the component 120 may comprise a memory, disk drive, processor, service, application, applet, firmware, or combinations thereof. The protected network 112 may further include servers 114, 115. Such systems are often used in high security situations and the intelligent screening devices 111 can be very expensive and still be limited in their ability to properly identify attacks on unknown service flaws or vulnerabilities. Additionally, the maintenance of the data testing routines 118 and the continual upgrade of attack countermeasures can be very intensive and expensive compared to the security measures used within the operating system to protect data as it is checked before the service or application is used, at 119, and after it has been processed, at 121, and is sent on for further use within the protected network 112. Further, these advanced screening devices often fail to or are unable to interrogate the payload of encrypted data packets (on layer 3 and up) prior to forwarding the data packets to the protected network because the encryption negotiation is not performed with the screening device as the end-point.

Figure 2:
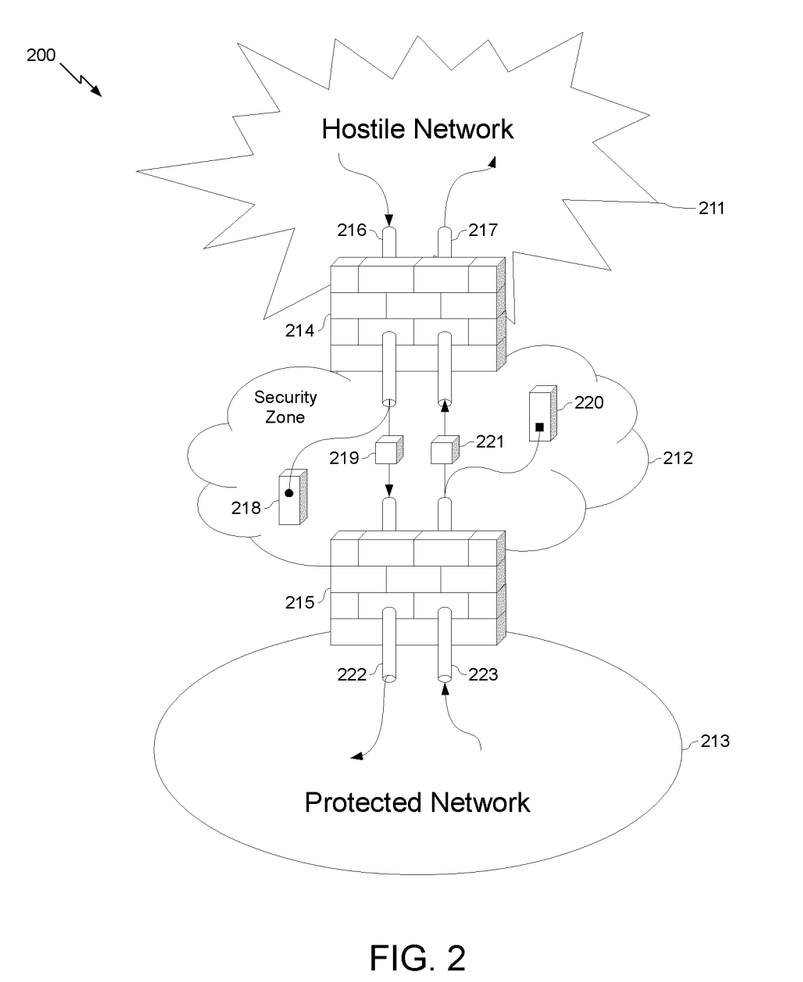
FIG. 2 provides a general overview of a known exemplary communication system.

With reference to FIG. 2, there is shown an exemplary communication system 200 that includes a security zone 212 comprising networked physical and/or virtual infrastructure 218, 219, 220, 221 that resides between a (possibly public) hostile network 211 (e.g., the Internet) and a separate protected network 213, and is known in the art. By deploying separate servers, physical or otherwise, 218, 219, 220, 221 within the security zone, individually running services that accept communications, in the form of service requests, on behalf of servers residing within the protected network, it is possible to prevent direct exposure of the protected network, in its entirety, to the hostile network 211. Further, these intermediary servers are able to provide additional security measures through the application of deep validation and/or inspection of the service request by executing it using a true service end-point before sending the service request, as-is or modified, to servers running similar or compatible services on the protected network. Examples of such inspections/tests may include, but are not limited to, reverse proxy services, bridging services, packet inspection routines, validation services, relaying services (e.g., SMTP email), and/or intrusion detection/prevention systems. Additionally, it should be obvious to skilled artisans that while the example in FIG. 2 demonstrates the use of "single-purposed" servers, it is equally possible to establish servers, physical or otherwise, in the protected network capable of running more than one distinct service. Multi-purpose servers, while cost effective, introduce additional factors and concerns that are not considered as secure as "single-purposed" servers.

With continued reference to FIG. 2, a system 200 may be required to handle a service request originating from a hostile network 211 arriving at an open/redirecting port 216 which is allowed by a perimeter screening device 214 to arrive in a security zone 212 and, based on the decision made by the screening device, may arrive at a service (not shown) running on a server 218 wherein the service request is dealt with locally and, for example, a response may be issued back through the same communication channel, if required. Alternatively, the service request may be forwarded to a service (not shown) running on a server 219 which further determines, through local processing of the service request, that the service request may need to be forwarded to a similar or compatible service residing within the protected network 213 and sends the request via an authorized channel 222 in an internal screening device 215. In related aspects, the system 200 may be required to handle a service request originating from the protected network 213 arriving at an open/redirecting port 223 which is allowed by the internal screening device 215 to arrive in the security zone 212 and, based on the decision made by the screening device, may arrive at a service (not shown) running on a server 220 wherein the service request is dealt with locally and, for example, is deemed to be inappropriate by the service running on the server 220 and is blocked from being allowed through to the hostile network 211. Alternatively, the service request may be forwarded to the service (not shown) running on a server 221 which further determines, through local processing of the service request, that the service request may be allowed to pass through to its intended destination on the hostile network 211 via a communications channel 217 on the perimeter screening device 214.

In related aspects, the system 200 may treat the protected network 213 as alien and untrusted, but may be configured to seamlessly work with the protected network 213 over a Local Area Network (LAN) infrastructure or the like. Similarly, the security zone 212 can be configured to have the same seamless capacity to work with multiple alien networks that may be located remotely (i.e., securely over the Internet). Therefore, the system is able to work bi-directionally whereby traffic destined for the remote networks (including the Internet), public or otherwise, can be interrogated in a manner equal to that of traffic destined for the protected network.

It should be noted that screening devices, such as those demonstrated in FIG. 1, being prior art, are not provided herein as comparative technology to the disclosed technology provided for in this text. Discussion of and definition of screening systems are included to demonstrate current security strategies undertaken by the majority of organizations connected to hostile networks, such as the Internet, and how the security of such screening devices, services and/or systems can be enhanced through the implementation of security zones as demonstrated in FIG. 2. The functionality of screening devices such as those in FIG. 1 are also covered herein for the purpose of demonstrating that such screening device functionality can be implemented into the disclosed technology as an additional service of the virtual network. Claim is not made to the actual functional aspects of such screening services.

With continued reference to FIG. 2, it is demonstrated that the security zone 212 is assembled using physical and/or virtual infrastructure and multiple screening devices 214 and 215. However, in another example (not shown) it is equally possible to deploy such a security zone with just one screening device and have the security zone reside either in front of, or behind the single screening device. Additionally, it should be obvious and understood by those skilled in the art, that the example illustrated might not clearly demonstrate the use of "single purposing" servers wherein a plurality of separate servers are used to segregate singular services from one another in order to heighten the effective security of each service through isolation. This requires that each server run its own operating system in order to support the individual service it hosts. It is possible for the separate servers to be deployed as virtual servers using hyper-visor technology however this does not escape the need for separate operating system installation and maintenance and it is argued that using such virtual servers can indeed degrade the effective security offered by deploying a security zone.

Systems such as those demonstrated in FIG. 2, including the alternative examples, are normally reserved for deployment by large organizations due to the costs involved and the complexities surrounding the deployment and ongoing maintenance. This sets such measures beyond the technical and/or financial reach of smaller organizations leaving them at risk of attacks that are able to circumvent the standard screening device protection approach outlined in discussion relating to FIG. 1. Additionally and often for the same reasons, less practice is made by organizations of any size to configure security zones between internal, often private, networks with differing security levels thereby increasing the risk of internal attack on critical and confidential systems.

The embodiments described below present techniques for implementing a virtual network capable of emulating the examples outlined in the discussion relating to FIG. 2, to help secure a separate protected network and bring the cost and complexity down. It is desirable that, for end users, each of the services have the appearance of working severally and separately on different servers, as previously demonstrated, while actually working together seamlessly and securely on one operating system residing on a singular machine, physical or otherwise. Such an outcome may be achieved by: emulating physical network engineering through software such as a virtual network, while retaining the benefits of a physical network, on a singular machine, physical or otherwise; and isolating each service in the virtual network individually without affecting the performance or reliability of the service, and without preventing communication with other "co-hosted" services within the virtual network. Further, while the embodiments described below demonstrate the use of a separate protected network, it is equally feasible for the embodiments to be demonstrated without the inclusion of the protected network which should be considered as having no effect on the implementation of the virtual network, its elements and related operations.

Figure 3:
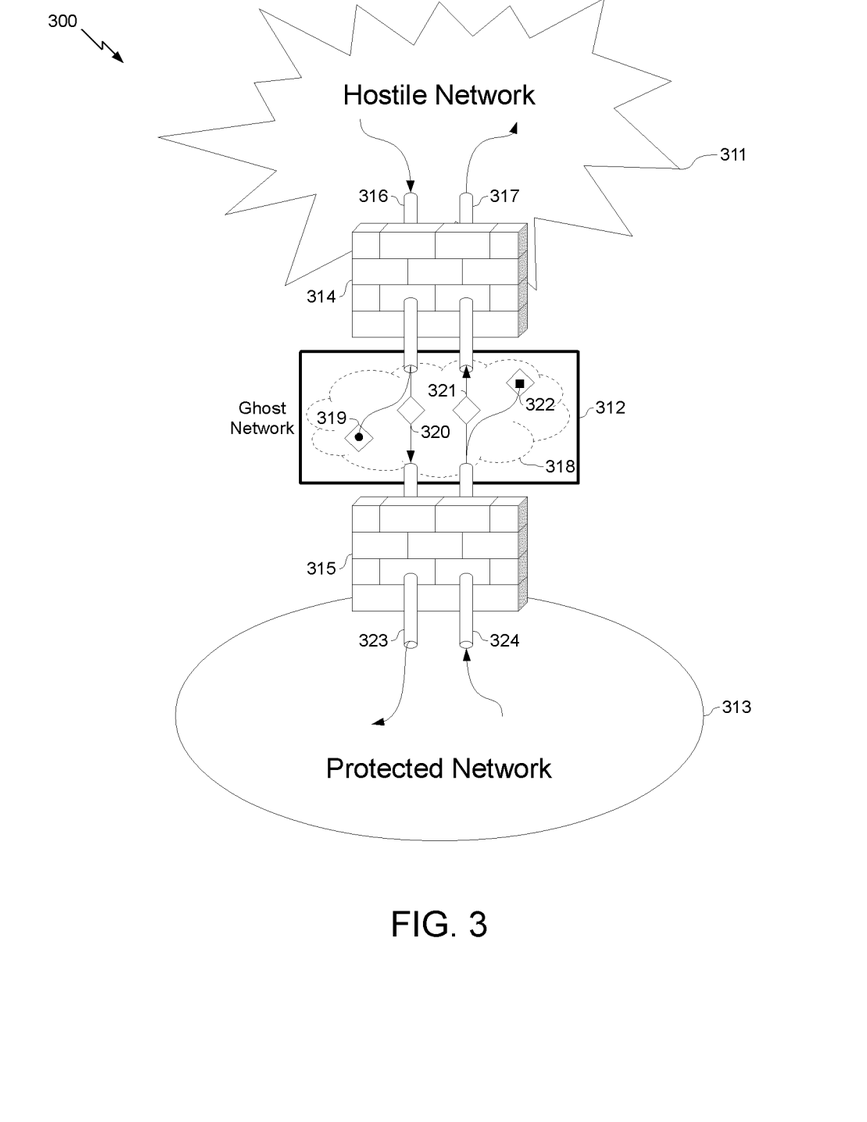
FIG. 3 illustrates an embodiment of a system for digital communication security using computer systems comprising a virtual network.

In accordance with the aspects of the embodiments described herein, the network security techniques described herein may be deployed as a virtual network known as a "Ghost Network" within a physical network segment, which remains analogous with a security zone. With reference to FIG. 3, there is shown an embodiment of an improved communications system 300 that includes a virtual network (Ghost Network) 318 that resides within a singular machine or appliance 312, physical or otherwise, which in turn resides between a hostile network 311 (e.g., the Internet) and a separate protected network 313. Each of the hostile network and the protected network are optionally separated from the security zone by a perimeter screening device 314 and an internal screening device 315 respectively. Services 319, 320, 321, 322 traditionally residing on separate servers in a similar physical security zone (as previously illustrated in FIG. 2) are implemented and run on a singular machine, physical or otherwise, yet remain isolated to maintain segregation from one another and to maintain a level of distrust in each other whereby each service is forced to communicate with others via internal networked communications as opposed to sharing resources via the underlying operating system (e.g., file system), thereby formulating a virtual "single-purposed" server. By having the services accept communications, in the form of service requests, on behalf of servers residing within the protected network, it is possible to prevent direct exposure of the protected network in its entirety to the hostile network 311. Further, these intermediary services are able to provide additional security measures through the application of deep validation and/or inspection of the service request by executing it using a true service end-point before sending the service request, as-is or modified, to servers running similar services on the protected network. Examples of such inspections/tests may include, but are not limited to, reverse proxy services, bridging services, packet inspection routines, validation services, relaying services (e.g., SMTP email), and/or intrusion detection/prevention systems.

With continued reference to FIG. 3, the system 300 may be required to handle a service request originating from the hostile network 311 arriving at an open/redirecting port 316 which is allowed by the screening device 314 to arrive in the security zone 318 running on the singular machine 312, physical or otherwise, and based on the decision made by the screening device, may arrive at a service 319 wherein the service request is dealt with locally and, for example, a response may be issued back through the same communication channel, if required. Alternatively, the service request may be forwarded to the service 320 which further determines, through local processing of the service request, that the service request may need to be forwarded to a similar service residing within the protected network 313 and sends the request via an authorized channel 323 in the internal screening device 315. In related aspects, the system 300 may be required to handle a service request originating from the protected network 313 arriving at an open/redirecting port 324 which is allowed by the screening device 315 to arrive in the security zone 318 and, based on the decision made by the screening device, may arrive at a service 322 wherein the service request is dealt with locally and, for example, is deemed to be inappropriate by the service and is blocked from being allowed through to the hostile network 311. Alternatively, the service request may be forwarded to the service 321 which further determines, through local processing of the service request, that the service request may be allowed to pass through to its intended destination on the hostile network 311 via a communications channel 317 on the perimeter screening device 314.

With continued reference to FIG. 3, it is demonstrated that the Ghost Network 312 is resident between multiple screening devices 314 and 315. However, in another example (not shown) it is equally possible to deploy such a Ghost Network with just one screening device and have the Ghost Network reside either in front of, or behind the single screening device. The Ghost Network may contain an embedded screening service that provides similar packet filtering capability, along with other relevant functions, that may negate the need to deploy separate screening devices ahead of the Ghost Network itself. A screening device can be employed ahead of or behind the Ghost Network but is not essential in order for the Ghost Network to function.

In related aspects, the system 300 may treat the protected network 313 as alien and untrusted, but may be configured to seamlessly work with the protected network 313 over a Local Area Network (LAN) infrastructure or the like. Similarly, the Ghost Network 318, running on the singular machine 312, physical or otherwise, can be configured to have the same seamless capacity to work with multiple alien networks that may be located remotely (e.g., securely over the Internet). Therefore, the system is able to work bi-directionally whereby traffic destined for the remote networks (including the Internet), public or otherwise, can be interrogated in a manner equal to that of traffic destined for the protected network.

Figure 4:
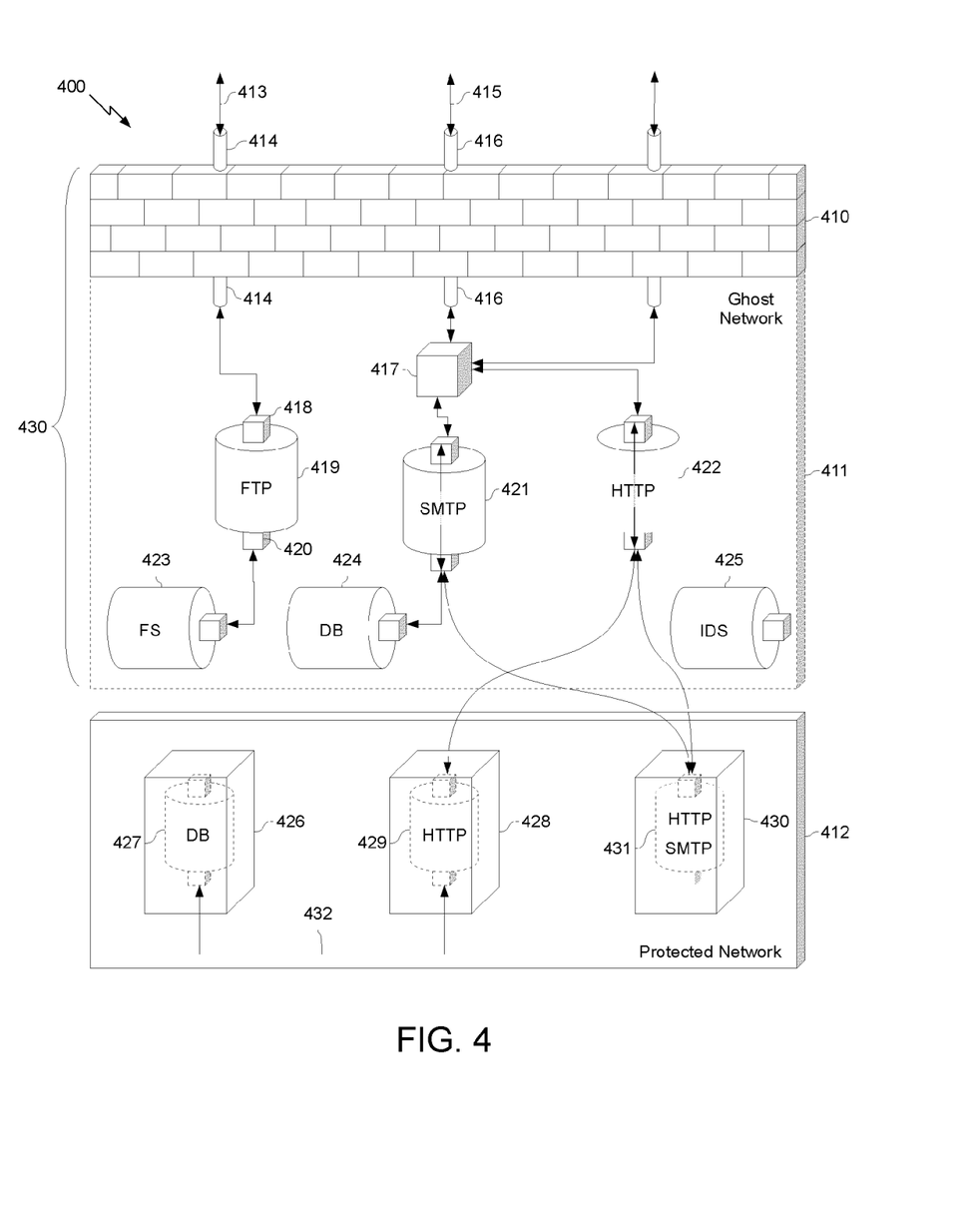
FIG. 4 illustrates an embodiment of the virtual or Ghost Network component in relation to a separate protected network.

FIG. 4 illustrates an embodiment of an improved security zone 430 that emulates a physical security zone using software, comprising an integrated embedded screening service 410 and a virtual Ghost Network 411 further comprising ghost services 419, 421, 422, 423 and applications 424, 425. In one embodiment, a service request 413 arrives from a hostile network (not shown), or the like, via the embedded screening service at an open service port 414 configured to allow the service request through to a service-specific, yet optional, pre-analysis module 418 of a corresponding ghost service 419, for example File Transfer Protocol (FTP) service. The ghost service confirms that it is able to handle the request safely and, via a service-specific, yet optional, post-analysis module 420 utilizes the services of an internal module 423, for example the underlying operating system's File System (FS), and the service request processing is finalized. In another embodiment, a service request 415 arrives from the hostile network, or the like, via the embedded screening service at an open service port 416 configured to allow the service request through to a non-specific or generic, yet optional, pre-analysis module 417 which may determine that the service request is valid and allows it through to a service-specific, yet optional, pre-analysis module of a corresponding ghost service 421, for example Simple Mail Transfer Protocol (SMTP) service. The ghost service 421 confirms that it is able to handle the request safely and, via a service-specific, yet optional, post-analysis module utilizes the services of an internal module 424, for example the embedded database application (DB) and determines that the service request must be forwarded to a protected server 430 residing in a separate protected network 412 running at least one service 431 able, in turn, to handle the incoming service request (e.g., SMTP service).

With continued reference to FIG. 4, in another alternative embodiment, a service request may be delivered from the hostile network and, being allowed through the embedded screening service 410, may arrive at the non-specific or generic, yet optional pre-analysis module 417 which may determine that the service request is valid and allows it through to a service-specific, yet optional, pre-analysis module of a corresponding ghost service 422, for example HyperText Transfer Protocol (HTTP) service. The ghost service 422 confirms that it is able to handle the request safely and, via a service-specific, yet optional, post-analysis module forward the request to one of a plurality of compatible services 429, 430 residing on separate servers 428, 430 wherein the service request is processed, possibly utilizing 432 an additional protected service 427 on protected server 426, and a possible response may be issued back to the intermediary ghost service 422 which may process the validity and/or authority of the response message and, if successful, relay the response message back to the origin client residing in the hostile network through the original communication channel.

In related aspects and with continued reference to FIG. 4, those of skill in the art would understand that the virtualizing of the security zone 430 would allow for additional supporting services, for example Intrusion Detection System (IDS) 425, to provide additional security benefit to the system without the need for physical networking and complex and often hit-and-miss heuristic analysis of network traffic in transit. Analysis of service requests can be done in real-time through the safe and isolated monitoring of outcomes as opposed to estimated or possible impact. Further, those of skill in the art would understand and appreciate that the embedded screening service could be wrapped around the entire security zone to facilitate additional post-process or, alternatively, outbound screening of traffic. Additionally, those of skill in the art would also understand the benefit of including clustering capability, or a similar replication service, into the system which would facilitate the ability for the system to be replicated across a plurality of similar machines whereby load balancing, higher availability and fail-over of the virtual network could be achieved.

It is noted that a Ghost Network need not be a complete duplicate of a protected network, or any other associated network it protects or is in communication with by one means or another. In one embodiment, the Ghost Network may comprise one duplicate service or application on a singular machine, physical or otherwise, configured to pre-process incoming data or service requests and verifying the information before sending it on to a destination service or application.

It is further noted that a system 400 for virtualizing network security may include a separate protected network 412 that comprises at least one protected server (e.g., servers 426, 428 and 430) as well as a virtual network 411 that comprises at least one ghost service (e.g., ghost services 419, 421, 422, 423, 424 and 425). The at least one ghost service (e.g., 419, 421 and 422) may be, but not limited to, a ghost of the at least one protected service (e.g., services 427, 429 and 431), or combination of such services, and may be configured to: receive a service request (e.g., request 413); run an inspection of the service request; execute the service request; and send the service request, unmodified or otherwise, to the protected network (e.g., private network 412), in response to the service request passing inspection and preliminary execution. In related aspects, the virtual network 411 may be a ghost or virtual duplicate of the protected network 412. The at least one ghost service may receive the service request via an integrated screening service 410 which in turn may receive the service request from an external physical screening device (not shown).

In further related aspects, those of skill in the art would understand that a singular ghost service (e.g., ghost service 422) may be a ghost or duplicate of a plurality of protected services (e.g., services 429 and 431) sequentially and/or concurrently. Equally, those of skill in the art would understand that a plurality of protected services on a singular machine (e.g., protected services 431 on a server 430) may be ghosted or duplicated, sequentially and/or concurrently, by a plurality of ghost services (e.g., ghost services 421 and 422).

In further related aspects, the at least one protected server may comprise at least one protected service. The at least one ghost service may comprise at least one application, the at least one ghost service being a duplicate or ghost of the at least one protected service. For example, the at least one ghost service may run the inspection by applying a pre-service security utility (e.g., intrusion detection/prevention, incoming packet filtering, or the like, or combination thereof). In addition, or in the alternative, the at least one ghost service may run the inspection by applying a post-service security utility (e.g., outgoing packet filtering, outgoing traffic scanning and/or control (e.g., email) or the like, or combination thereof). In yet further related aspects, the at least one ghost service may block passage of the service request to the protected network, in response to the service request failing the inspection.

Figure 5:
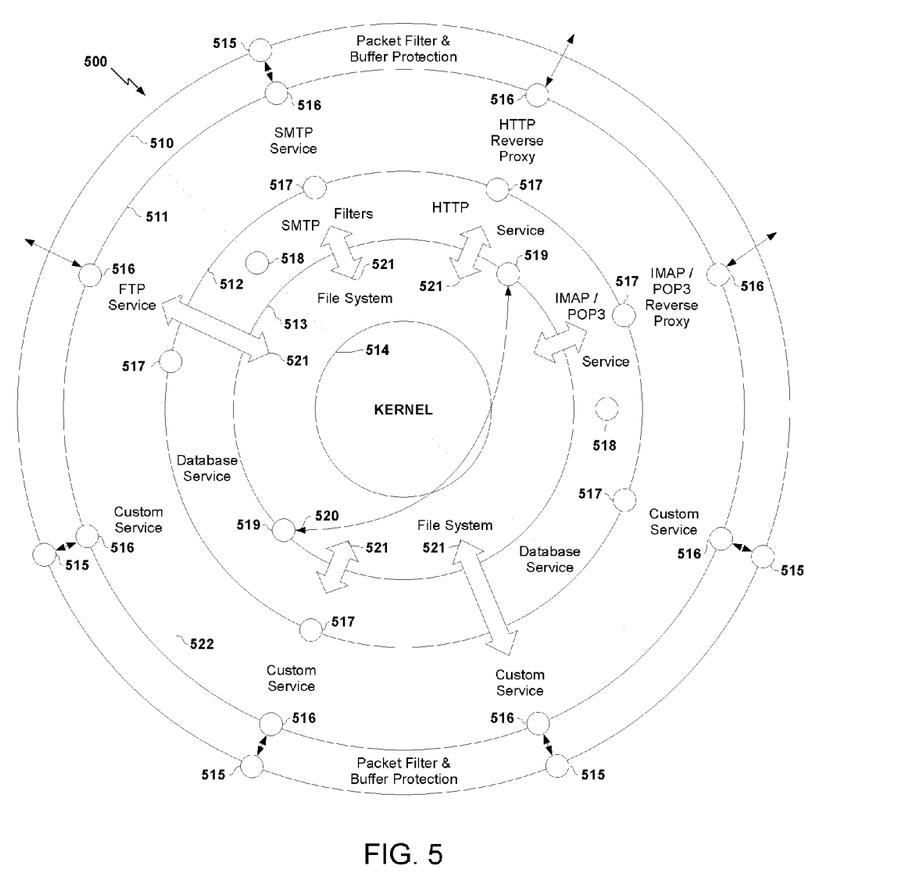
FIG. 5 illustrates an embodiment of the relationships between ghost services within the virtual network.

FIG. 5 demonstrates the inner workings of a system 500 including the isolation of and the relation-ships between the ghost services of a Ghost Network. The system 500 comprises a packet filter and outer buffer protection ring 510 that may block or accept at least one incoming data packet arriving via a network socket 515 in the outer packet filter and buffer protection ring and optionally rebuilding a service request from the at least one data packet for processing by an optional pre-service analysis security utility before breaking the service request down again into, possibly different, data packets. It is equally possible that while the at least one data packet must pass through the packet filter, the at least one data packet may bypass the pre-service analysis security utility and flow directly to a corresponding service in the outer service ring 511 via a corresponding outer service ring network socket 516. The outer service ring 511 may comprise at least one ghost service, for example an SMTP, an IMAP/POP3 reverse proxy service, an HTTP reverse proxy service, an FTP service and/or custom services, capable of accepting at least one data packet directly via the packet filter or via the pre-service analysis security utility. The at least one ghost service may build a service request from the at least one data packet arriving via the corresponding outer service ring network socket 516 wherein the ghost service will execute the service request in order to determine what must be done with the service request.

With continued reference to FIG. 5, the ghost service may, in executing the service request, determine that it is capable of handling the request locally and, with the possible utilization, via network communication sockets 517, of additional supporting services and/or applications within the inner or protected service ring 512 (e.g., database service, file systems, mail filters, true HTTP service, true IMAP/POP3 service), generate a response to be issued back to the origin of the service request. Equally, the ghost service may, in executing the service request, determine that the service request is invalid in its entirety or in part, contains an error and/or is simply unsupported and the execution of the request is terminated or aborted. A response may be generated and issued back to the origin of the service request. Finally, the ghost service may, in executing the service request, determine that the service request be handled by a protected server within the protected network wherein the service request is forwarded by the ghost service to at least one protected service on the at least one protected server. The virtual service may await at least one response from the at least one protected service running on the at least one protected server wherein any such response is screened and/or inspected and on passing the screening and/or inspection, is issued back to the origin of the service request.

With continued reference to FIG. 5, the Ghost Network system 500 may comprise an inner or protected service ring 512, wherein at least one supporting service and/or application may run but is not directly exposed by the Ghost Network system 500 to any other network, hostile or otherwise, preventing direct external communication with the at least one supporting service and/or application within the inner or protected service ring 512. Additionally, and equally protected from external exposure, lies the file system ring 513 which may provide protected storage facilities to the Ghost Network system 500 to be utilized 521 as needed by any one of or all of the at least one supporting services or applications and/or the at least one ghost services. The file system ring is provided in turn by the Ghost Network system's operating system Kernel 514 which remains protected by the outer rings of the Ghost Network system 500. FIG. 5 further demonstrates that, when a plurality of ghost services and/or supporting services and/or applications are present, it is possible for these services and applications to communicate 520 with each other via corresponding network communication sockets 518 and 519.

In related aspects and with continued reference to FIG. 5, it is noted that the embodiment of the Ghost Network system 500 demonstrated, is shown, by example, to comprise a plurality of ghost services within the outer service ring 511 and supporting services and applications within the inner protected service ring 512. It is further demonstrated that an individual service and/or application, incorporating a slice of the file system and the operating system kernel, may be isolated and separated from other services and/or applications, file system slices and kernel segments depicted as isolation units or, more precisely, a representation of a singular virtual server 522 optionally operating as a "single-purposed" server. To this end, each virtual server may preferably contain just one singular service or application (although a plurality of services and/or applications is acceptable if required), protected or otherwise, preventing the direct, unrestrained sharing of resources residing within the virtual server with other services and/or applications, protected or otherwise, and vice-versa. Communication between services and/or applications, therefore, is limited only to occur via network communication sockets (e.g., network communication sockets 515, 516, 517, 518 and 519)

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks as some blocks may occur in different orders and/or at substantially the same time with other blocks from what is depicted and described herein. Moreover, not all illustrated blocks may be required to implement methodologies describe herein. It is to be appreciated that functionality associated with blocks may be implemented by software, hardware, a combination thereof or any other suitable way (e.g., device, system, process or component). Additionally, it should be further appreciated that methodologies disclosed throughout this specification are capable of being stored on an article of manufacture to facilitate transporting and transferring such methodologies to various devices. Those of skill in the art will understand and appreciate that a methodology could alternatively be represented as a series of interrelated states or events, such as in a state diagram.

Figure 6:
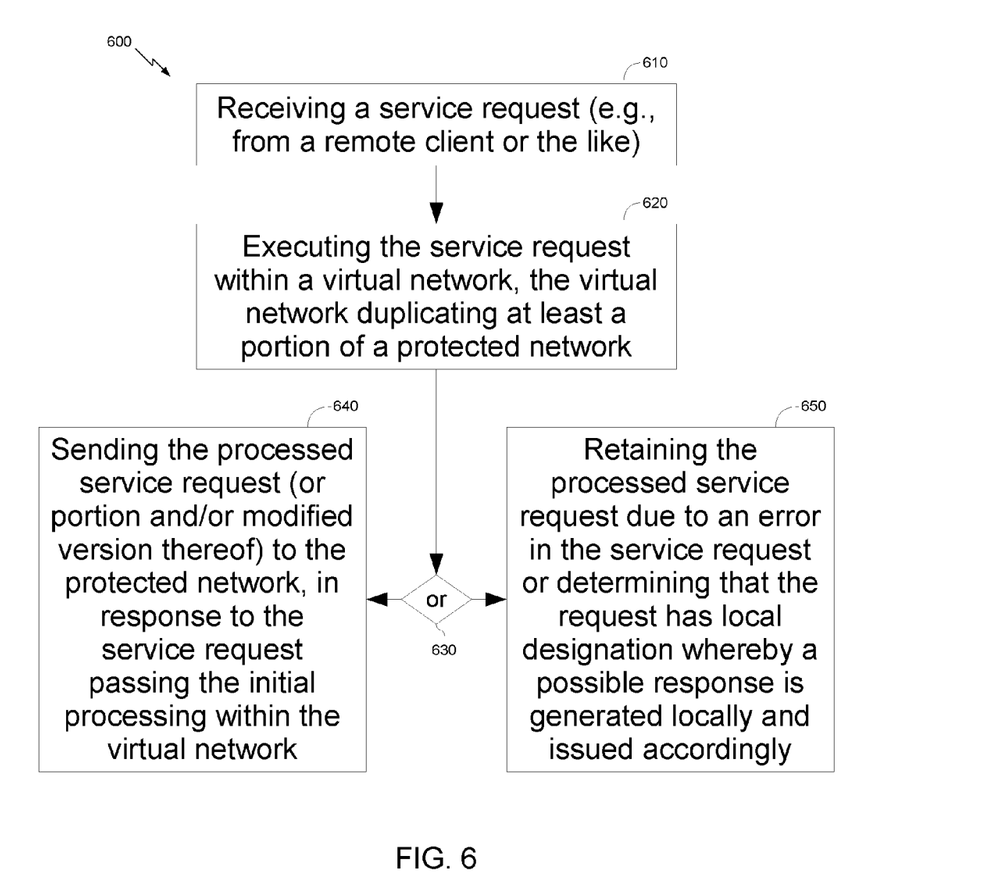
FIG. 6 illustrates an example methodology for network security.

In accordance with one or more aspects of the embodiments described herein, there is provided a method for network security. With reference to FIG. 6, illustrated is a methodology 600 that may be performed by at least one computing device. In one embodiment, the method 600 may be performed by a virtual entity (e.g., a virtual network, at least one virtual server of the virtual network, and/or at least one ghost service and/or application of the at least one virtual server). The method 600 may involve, at 610, receiving a service request (e.g., from a remote client or the like). The method 600 may involve, at 620, executing the service request within a virtual network, the virtual network optionally duplicating at least a portion of a separate protected network. The method 600 may involve a decision, at 630, performed by the virtual entity to involve, at 640, sending the processed service request (or portion and/or modified version thereof) to the protected network, in response to the service request passing the initial processing in the virtual network. The method 600 may involve a decision, at 630, performed by the virtual entity to involve, at 650, retaining the processed service request due to an error in the service request or determining that the request has local designation whereby a possible response is generated locally and issued accordingly.

In related aspects, the protected network may comprise at least one protected server. The at least one protected server may comprise at least one protected service and/or application. The virtual network may comprise at least one virtual server, the at least one virtual server being a ghost of the at least one protected server. The at least on virtual server may comprise at least one ghost service and/or application, the at least one ghost service and/or application being a stand-alone or final service and/or application and/or a duplicate of the at least on protected service and/or application.

Figure 7:
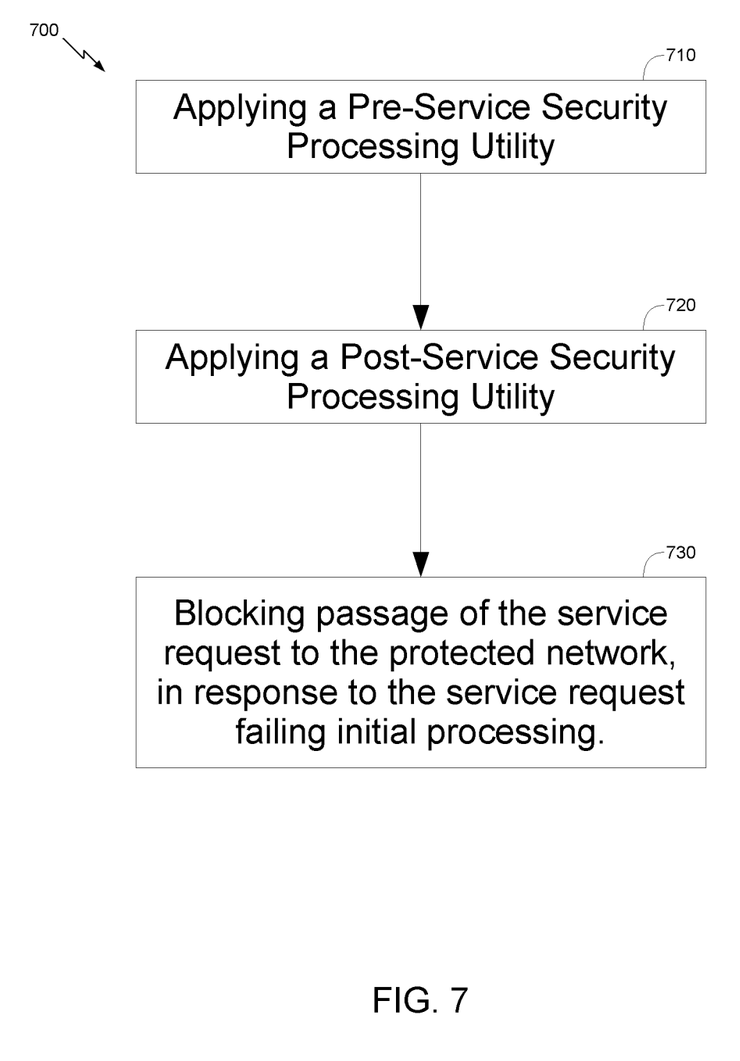
FIG. 7 shows further aspects of the methodology of FIG. 6.

With reference to FIG. 7, running the processing may involve, at 710, applying a pre-service security utility. In addition, or in the alternative, running the processing may involve, at 720, applying a post-service security utility. In further related aspects, the method 700 may involve, at 730, blocking passage of the service request to the protected network in response to the service request failing initial processing.

Figure 8:
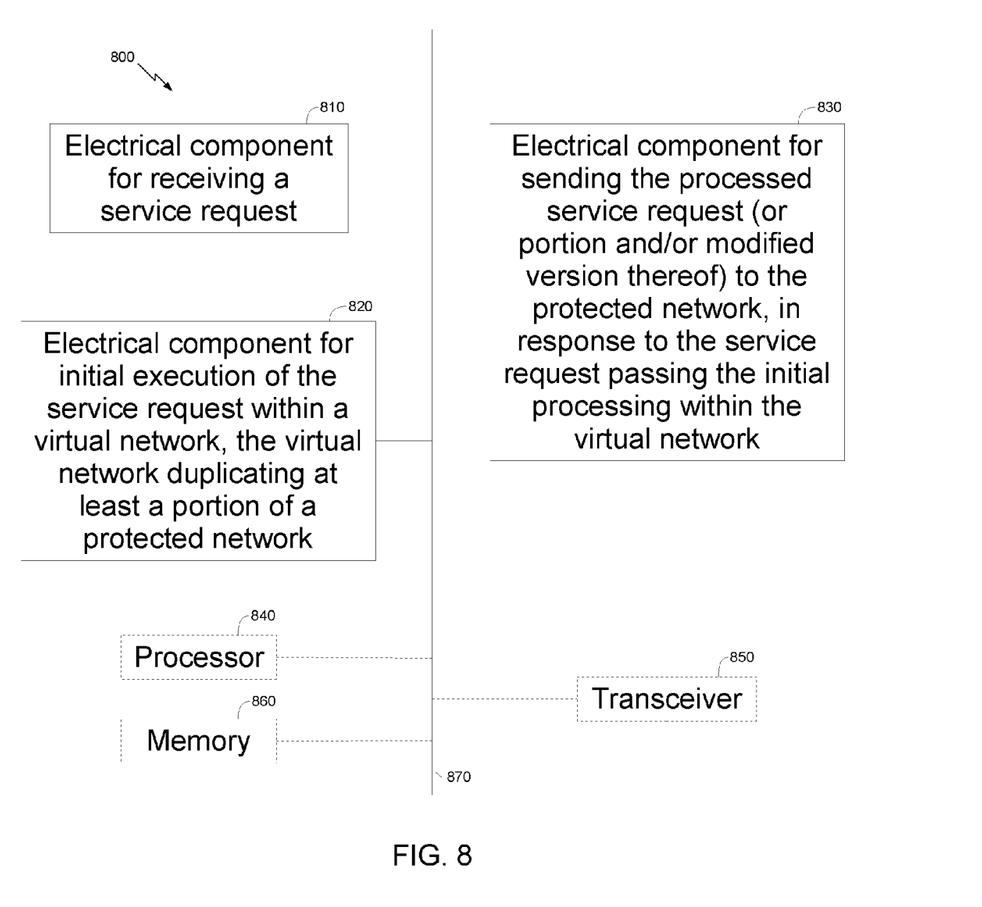
FIG. 8 illustrates an exemplary apparatus for network security.

In accordance with one or more aspects of the embodiments described herein, there are provided devices and apparatuses for executing the pre-screening of data and/or service requests, as described with reference to FIGS. 6-7. With reference to FIG. 8, there is provided an exemplary apparatus 800 that may be configured as an actual or virtual computing device, processor and/or similar device for use within the computing device. The apparatus 800 may include functional blocks that can represent functions implemented by an actual or virtual processor, software or combination thereof (e.g., firmware).

As illustrated in one embodiment, the apparatus 800 may comprise an electrical component or module 810 for receiving a service request. The apparatus 800 may comprise an electrical component 820 for initial execution of the service request within a virtual network, the virtual network optionally duplicating at least a portion of a separate protected network. The apparatus 800 may comprise an electrical component 830 for sending the processed service request (or portion and/or modified version thereof) to the protected network, in response to the service request passing the initial processing within the virtual network.

In related aspects, the apparatus 800 may optionally include a processor component 840 having at least one processor, in the case of the apparatus 800 configured as a computing network entity, rather than as a processor. The processor 840, in such a case, may be in operative communication with the components 810-830 via a bus 870 or similar communication coupling. The processor 840 may effect initiation and scheduling of the process or functions performed by electrical components 810-830.

In further related aspects, the apparatus 800 may include a communication component 850 (e.g., an Ethernet interface module, radio transceiver module, etc.). The apparatus 800 may include a component for storing information, such as, for example, a memory device/component 860. The computer readable medium or the memory component 860 may be operatively coupled to the other components of the apparatus 800 via the bus 870 or the like. The memory component 860 may be adapted to store computer readable instructions and data for effecting the processes and behavior of the components 810-830, and sub-components thereof, or the processor 840 or the methods disclosed herein. The memory component 860 may retain instructions for executing functions associated with the component 810-830. While shown as being external to the memory 860, it is to be understood that the components 810-870 can exist within the memory 860.

Figure 9:
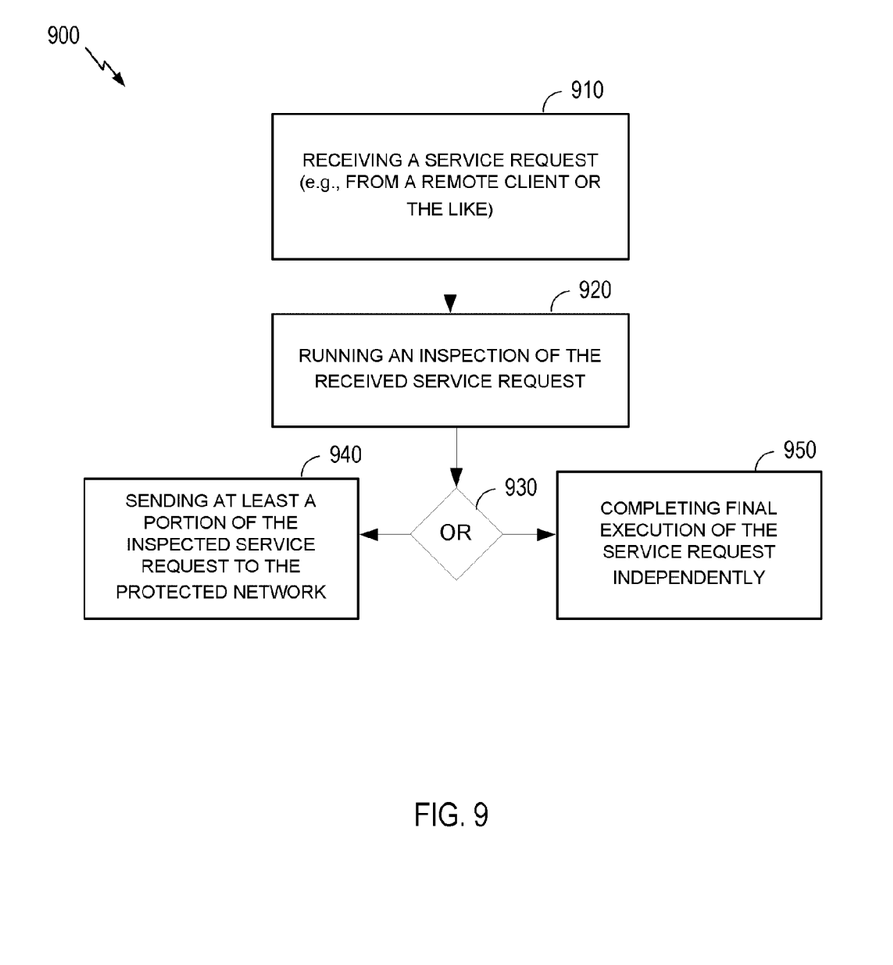
FIG. 9 illustrates another example methodology for network security.

In accordance with one or more aspects of the embodiments described herein, there is provided a method 900 for network security. With reference to FIG. 9, illustrated is a method 900 that may be performed by a virtual entity (e.g., a virtual network, at least one virtual server of the virtual network, and/or at least one ghost service and/or application of the at least one virtual server) in a network system. The method 900 may involve, at 910, receiving a service request (e.g., from a remote client or the like). The method 900 may involve, at 920, running an inspection of the received service request. The inspection may be run within a virtual network residing on an operating system within a singular machine, physical or otherwise. If the service request passes the inspection, the method 900 may further involve a decision, at 930, performed by the virtual entity to involve, at 940, sending at least a portion of the inspected service request to the protected network. Alternatively, if the service request passes the inspection, the method 900 may involve a decision, at 930, performed by the virtual entity to involve, at 950, completing final execution of the service request independently. In some embodiments, if the service request fails any part of the inspection, the inspection is aborted or the passage of the service request to the protected network is blocked.

It is understood that the specific order or hierarchy of steps in the processes disclosed is an example of exemplary approaches. Based upon the design preferences, it is understood that the specific order or hierarchy of steps in the processes may be rearranged while remaining within the scope of the present disclosure. The accompanying method claims present elements of the various steps in a sample order, and are not mean to be limited to specific order of hierarchy presented.

Those of skill in the art would understand that information and signals may be represented using any of a variety of different technologies and techniques. For example, data, instructions, commands, information, signals, bits, symbols, and chips that may be referenced through the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from once place to another. A storage media may be any available media that can be accessed by a computer. By way of example, and not limitation, such computer-readable media can comprise RAM, ROM, EEPROM, CD-ROM or other optical disk storage, magnetic disk storage other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber-optic cable, twisted pair, DSL, or wireless technologies such as infra-red, radio, and microwave, then the coaxial cable, fiber-optic cable, twisted pair, DSL, or wireless technologies such as infra-red, radio, and microwave are included in the definition of medium. Disk and disc, as used herein, includes Compact Disc (CD), laser disc, optical disc, Digital Versatile Disc (DVD), floppy disk and Blu-ray disc, where disks usually reproduce data magnetically, while discs reproduce data optically with lasers. Combinations of the above should also be included within the scope of computer-readable media.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for network security, comprising:
   a protected network comprising at least one protected server, wherein the protected server is configured to provide at least one protected service; and
   a virtual network residing on an operating system within a singular machine, physical or otherwise, and configured to emulate a physical security zone network, the virtual network comprising one or more virtual servers;
   wherein each of the one or more virtual servers is configured to provide an isolated ghost service, the ghost service being separated from other isolated ghost services located in other virtual servers such that the ghost service does not directly share any resources with the other ghost services,
   wherein the ghost service is a partial copy of the at least one protected service, and
   wherein each of the one or more virtual servers is configured to provide the ghost service by:
   receiving a service request;
   running an inspection of the received service request;
   determining whether additional information from one or more of the other isolated ghost services or one or more of the at least one protected service is needed for execution of the service request;
   requesting additional information from one or more of the other isolated ghost services for the execution of the service request in response to determining that the additional information from the one or more of the other isolated ghost services is needed for execution of the service request;
   requesting additional information from one or more of the at least one protected service for the execution of the service request in response to determining that the additional information from the one or more of the at least one protected service is needed for execution of the service request;
   in response to the service request passing inspection, completing the execution of the service request based on the received service request, wherein the execution of the service request is further based on:
   (i) the additional information from the one or more of the other isolated ghost services in response to requesting the additional information from the one or more of the other isolated ghost services, and (ii) the additional information from the one or more of the at least one protected service in response to requesting the additional information from the one or more of the at least one protected service; and
   in response to detecting an error in the inspected service request, transmitting a response to the service request, the response being indicative of the detected error.

2. The system of claim 1, wherein the virtual network is configured to function independently of the protected network and wherein the virtual network is at least a partial representation of the protected network.

3. The system of claim 1, wherein each of the one or more virtual servers is configured to receive the service request from a source outside of the virtual network or from a source inside of the virtual network via the virtual network.

4. The system of claim 1, wherein each of the one or more virtual servers is configured to provide the ghost service via running the inspection of the service request by:
applying at least one of a pre-service security utility or a post-service security utility.

5. The system of claim 1, wherein the ghost service is a ghost of the protected service and wherein the ghost service comprises at least one of a pre-service security utility or a post-service security utility.

6. The system of claim 1, wherein the ghost service of a first virtual server is further configured to communicate with the ghost service of a second virtual server via the virtual network.

7. The system of claim 4, wherein each of the one or more virtual servers is configured to provide the ghost service via aborting execution of or preventing communications related to the service request in response to the service request failing any part of the execution.

8. The system of claim 1, wherein the portion of the inspected service request comprises a modified version of the inspected service request.

9. The system of claim 1, wherein the ghost service is isolated from all of the other virtual servers within the virtual network.

10. The system of claim 1, wherein the ghost service is further configured to:
screen one or more service requests for malicious content, including encrypted payloads; and
act as an exposed end-point on behalf of one or more protected servers.

11. The system of claim 10, wherein each of the virtual servers is further configured to:
pass the request over to one or more protected servers for further or final execution and/or response.

12. The system of claim 1, wherein each virtual server is configured to provide a single isolated ghost service, each virtual server thereby emulating a single purposed server.

13. The system of claim 12, wherein each ghost service is configured to communicate with other ghost services via network communication sockets.

14. A method operable by a virtual entity in a network system, comprising:
receiving a service request;
running an inspection of the received service request within a virtual network, the virtual network residing on an operating system within a singular machine, physical or otherwise, and configured to emulate a physical security zone network, the virtual network comprising one or more virtual servers, each of the one or more virtual servers being configured to provide an isolated ghost service, the ghost service being separated from other ghost services located in other virtual servers such that the ghost service does not directly share any resources with the other ghost services, wherein the ghost service is a partial copy of at least one protected service provided by at least one protected server;
determining whether additional information from one or more of the other isolated ghost services or one or more of the at least one protected service is needed for execution of the service request;
requesting additional information from one or more of the other isolated ghost services for the execution of the service request in response to determining that the additional information from the one or more of the other isolated ghost services is needed for execution of the service request;
requesting additional information from one or more of the at least one protected service for the execution of the service request in response to determining that the additional information from the one or more of the at least one protected service is needed for execution of the service request;
in response to the service request passing the inspection, completing, via the virtual network, the execution of the service request based on the received service request, wherein the execution of the service request is further based on: (i) the additional information from the one or more of the other isolated ghost services in response to requesting the additional information from the one or more of the other isolated ghost services, and (ii) the additional information from the one or more of the at least one protected service in response to requesting the additional information from the one or more of the at least one protected service; and
in response to detecting an error in the inspected service request, transmitting a response to the service request, the response being indicative of the detected error.

15. The method of claim 14, wherein the virtual entity comprises at least one of: (a) the virtual network, (b) the virtual servers of the virtual network, or (c) a ghost service of one of the virtual servers.

16. The method of claim 14, wherein the receiving comprises receiving the service request from a source outside of the virtual network or from a source inside of the virtual network via the virtual network.

17. The method of claim 14, wherein:
the at least one protected server is included in a protected network, wherein the protected server comprises the at least one protected service;
the virtual network comprises the virtual servers;
the virtual servers are a ghost of the protected server; and
the ghost service is configured to run the inspection of the received service request.

18. The method of claim 17, wherein the virtual network is configured to function independently of the protected network and wherein the virtual network is at least a partial representation of the protected network.

19. The method of claim 17, wherein the running the inspection of the service request comprises:
applying at least one of a pre-service security utility or a post-service security utility.

20. The method of claim 17, wherein the ghost service is a ghost of the protected service and wherein the ghost service comprises at least one of a pre-service security utility or a post-service utility.

21. The method of claim 17, further comprising the ghost service of a first virtual server communicating with the ghost service of a second virtual server via the virtual network.

22. The method of claim 17, wherein the ghost service is isolated from all of the other virtual servers within the virtual network.

23. The method of claim 19, further comprising aborting, via the ghost service, execution of the service request or preventing communications relating to the service request in response to the service request failing any part of the execution.

24. The method of claim 14, wherein the portion of the inspected service request comprises a modified version of the inspected service request.

25. A non-transitory computer-readable medium comprising code for causing a computer to:
    receive a service request;
    run an inspection of the received service request within a virtual network, the virtual network residing on an operating system within a singular machine, physical or otherwise, and configured to emulate a physical security zone network, the virtual network comprising one or more virtual servers, each of the virtual servers being configured to provide an isolated ghost service, the ghost service being separated from other ghost services located in other virtual servers such that the ghost service does not directly share any resources with the other ghost services, wherein the ghost service is a partial copy of at least one protected service provided by at least one protected server;
    determine whether additional information from one or more of the other isolated ghost services or one or more of the at least one protected service is needed for execution of the service request;
    request additional information from one or more of the other isolated ghost services for the execution of the service request in response to determining that the additional information from the one or more of the other isolated ghost services is needed for execution of the service request;
    request additional information from one or more of the at least one protected service for the execution of the service request in response to determining that the additional information from the one or more of the at least one protected service is needed for execution of the service request;
    in response to the service request passing the inspection, complete, via the virtual network, the execution of the service request based on the received service request, wherein the execution of the service request is further based on: (i) the additional information from the one or more of the other isolated ghost services in response to requesting the additional information from the one or more of the other isolated ghost services, and the additional information from the one or more of the at least one protected service in response to requesting the additional information from the one or more of the at least one protected service; and
    in response to detecting an error in the inspected service request transmit a response to the service request, the response being indicative of the detected error.

26. The non-transitory computer-readable medium of claim 25, further comprising code for causing the computer to receive the service request from a source outside of the virtual network or from a source inside of the virtual network via the virtual network.

27. The non-transitory computer-readable medium of claim 25, wherein:
    the at least one protected server is included in a protected network, wherein the protected server comprises the at least one protected service; and
    the virtual network comprises the virtual servers;
    the virtual servers are a ghost of the protected server; and
    the ghost service is configured to run the inspection of the received service request.

28. The non-transitory computer-readable medium of claim 27, wherein the virtual network is configured to function independently of the protected network and wherein the virtual network or at least a partial representation of the protected network.

29. The non-transitory computer-readable medium of claim 27, further comprising code for causing the computer to run the inspection of the service request via:
    applying at least one of a pre-service security or a post-service security utility.

30. The non-transitory computer-readable medium of claim 27, wherein the ghost service is a ghost of the protected service and wherein the ghost service comprises at least one of a pre-service security utility and a post-service security utility.

31. The non-transitory computer-readable medium of claim 27, further comprising code for causing the ghost service of a first virtual server to communicate with the ghost service of a second virtual server via the virtual network.

32. The non-transitory computer-readable medium of claim 27, wherein the ghost service is isolated from all of the other virtual servers within the virtual network.

33. The non-transitory computer-readable medium of claim 29, further comprising code for causing the computer to abort execution of the service request or prevent communications relating to the service request in response to the service request failing any part of the execution.

34. The non-transitory computer-readable medium of claim 25, wherein the portion of the inspected network request comprises a modified version of the inspected network request.

* * * * *